US008392191B2

(12) United States Patent
Qing et al.

(10) Patent No.: US 8,392,191 B2
(45) Date of Patent: Mar. 5, 2013

(54) CHINESE PROSODIC WORDS FORMING METHOD AND APPARATUS

(75) Inventors: Guo Qing, Beijing (CN); Nobuyuki Katae, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 937 days.

(21) Appl. No.: 12/000,178

(22) Filed: Dec. 10, 2007

(65) Prior Publication Data

US 2008/0147405 A1 Jun. 19, 2008

(30) Foreign Application Priority Data

Dec. 13, 2006 (CN) .......................... 2006 1 0167040

(51) Int. Cl.
*G10L 13/00* (2006.01)
*G06F 17/27* (2006.01)

(52) U.S. Cl. ............................................ 704/258; 704/9

(58) Field of Classification Search ........................ None
See application file for complete search history.

(56) References Cited

U.S. PATENT DOCUMENTS 5,850,629 A 12/1998 Holm et al. .................... 704/260
6,003,005 A 12/1999 Hirschberg .................... 704/260
6,173,262 B1 1/2001 Hirschberg .................... 704/260
6,978,239 B2 12/2005 Chu et al. ....................... 704/258
6,996,529 B1 2/2006 Minnis ........................... 704/258
7,136,802 B2 * 11/2006 Ying et al. ......................... 704/1
7,263,488 B2 * 8/2007 Chu et al. ....................... 704/251

FOREIGN PATENT DOCUMENTS

JP 9-62286 3/1997

OTHER PUBLICATIONS

Qian et al., "Segmenting Unrestricted Chinese Text into Prosodic Words Instead of Lexical Words", International Conference on Acoustic, Speech, and Signal Processing, Salt Lake City, 2001.*

Lee et al., "Tree-Based Modeling of Prosodic Phrasing and Segmental Duration for Korean TTS Systems", Speech Communication, vol. 28, 1999, pp. 283-300.*

Chi-Lin Shih, "The Prosodic Domain of Tone Sandhi in Chinese", University of California, San Diego, 1986, 276 pages, including pp. 1-260.

Chu, M. et al., "Locating Boundaries for Prosodic Constituents in Unrestricted Mandarin Texts," Computational Linguistics and Chinese Language Processing, vol. 6, No. 1, Feb. 2001, pp. 1-22 in English.

(Continued)

*Primary Examiner* — Samuel G Neway
(74) *Attorney, Agent, or Firm* — Staas & Halsey LLP

(57) ABSTRACT

The present invention provides a method and apparatus of forming Chinese prosodic words, which method comprises the steps of inputting Chinese text; performing process of word segmentation and part of speech annotation for the input Chinese text to generate an initial prosodic word sequence; inserting grids representing prosodic word boundaries for all the words in the initial prosodic word sequence to generate a grid prosodic word sequence; annotating the grids ready to be deleted in the grid prosodic word sequence based on the prosodic word forming means; judging the grids which actually need to be deleted in the grids ready to be deleted based on the prosodic word forming means; deleting the grids which actually need to be deleted in the grid prosodic word sequence, and word forming the words between every two grids in the remaining grids to generate prosodic words. The present invention avoids the defect whereby the type of insertion error of the prosodic word would render the pronunciation hard to understand or unnatural as far as possible, and reduces the number of the type of insertion error of prosodic word boundaries.

10 Claims, 6 Drawing Sheets

OTHER PUBLICATIONS

Dong, H. et al., "Prosodic Word Prediction Using the Lexical Information" (5 pages).

Dong, M. et al., "A Probabilistic Approach to Prosodic Word Prediction for Mandarin Chinese TTS" (4 pages).

Shao, Y. et al., "Prosodic Word Boundaries Prediction for Mandarin Text-to-Speech," International Symposium on Tonal Aspects of Languages: With Emphasis on Tone Languages, Beijing, China, Mar. 28-31, 2004 (4 pages).

Shi, Q. et al., "Statistic Prosody Structure Prediction" (4 pages).

Ying, Z. et al., "An RNN-based Algorithm to Detect Prosodic Phrase for Chinese TTS" (4 pages).

Japanese Office Action dated Dec. 6, 2011 issued in Japanese Patent Application No. 2007-322494.

Yusuke Furuyama, et al., "Use of Linguistic Information for Automatic Extraction of F0 Contour Generation Process Model Parameters", Technical Report of IEICE, The Institute of Electronics, Information and Communication Engineers, Aug. 14, 2003, vol. 103, No. 263, pp. 37-42.

* cited by examiner

CHINESE PROSODIC WORDS FORMING METHOD AND APPARATUS

CROSS-REFERENCE TO RELATED APPLICATION

This application claims the benefit of Chinese Application No. 200610167040.0, filed Dec. 13, 2006 in the State Intellectual Property Office of the People's Republic of China, the contents of which are incorporated herein by reference.

FIELD OF THE INVENTION

The present invention relates to Chinese speech synthesis technology, more specifically to a processing technology for performing prosodic words grouping on input Chinese sentences in a Chinese speech synthesis system, and more particularly to a Chinese prosodic words forming method and apparatus.

BACKGROUND OF THE RELATED ARTS

When a plurality of Chinese characters forms into words or phrases to be consecutively pronounced, they affect one another to form comparatively separated and complete prosodic blocks, the prosodic characteristics of which have very important function on the naturalness of the speech. The combination of different prosodic blocks usually forms different tunes to render a person's pronunciation in possession of different tones. Generally speaking, the main prosodic units in the Chinese speech include prosodic words, prosodic phrases and intonational phrases. The prosody of the Chinese language is of a layered structure, and such a layered prosodic structure forms the rhythm (prosody) of the Chinese speech. The boundary of a prosodic unit usually corresponds to the stop, the change in fundamental frequency or the change in audio duration of a prosodic boundary syllable in the speech. Prosody is an important factor affecting the naturalness and comprehensibleness of a synthesized speech. In the speech synthesis system, the prosodic structure provides the prosodic parameter prediction model with very important information, whereby the objective of controlling the mode of pronunciation of the speech synthesis system is achieved through prediction of such parameters as the fundamental frequency, the audio duration (duration) and the stop etc., so as to achieve the corresponding prosodic effect of the prosodic units at each level in the synthesized speech, to thereby render the pronunciation natural and melodious.

With the ever deeper development of linguistic processing, people need not only to learn more about the prosodic structure of the natural speech, but also try to find a method for predicting the prosodic structure from the text, so as to enhance the naturalness of the synthesized speech or the preciseness of the speech recognition in a more effective manner, and deepen the degree for understanding natural languages at the same time.

The prosodic word denotes a group of syllables that are consecutively pronounced in an audio stream, and the pronunciations between these syllables are very closely related and there is no stop to the audial perception. The prosodic word is an element of the lowest level in the layered structure of the prosody, and there is usually a perceptible stop at the boundary of the prosodic word. In other words, there is no perceptible stop inside the prosodic word, as the stop merely appears at the boundary of the prosodic word. Not all prosodic word boundaries have stops in the actual speech. It is acceptable when there is a perceptible stop at the boundary of the prosodic word, but any perceptible stop inside the prosodic word will render the speech either hard to understand or unnatural. Consequently, a good prosodic word forming module is of great significance to enhancing the naturalness of the synthesized speech.

There have been many published dissertations and patents in the prior art, such as those presented below, relating to the studies on the prosodic word forming module and the enhancement of the naturalness of the synthesized speech.

U.S. Pat. No. 6,996,529 (Minnis; Stephen; Feb. 7, 2006, Speech synthesis with prosodic phrase boundary information);

U.S. Pat. No. 6,173,262 (Hirschberg; Julia; Jan. 9, 2001, Text-to-speech system with automatically trained phrasing rules);

U.S. Pat. No. 6,003,005 (Hirschberg; Julia; Dec. 14, 1999, Text-to-speech system and a method and apparatus for training the same based upon intonational feature annotations of input text);

U.S. Pat. No. 5,850,629 (Holm; Frode; Pearson; Steve; Dec. 15, 1998, User interface controller for text-to-speech synthesizer);

U.S. Pat. No. 6,978,239 (Chu; Min; Peng; Hu; Dec. 20, 2005, Method and apparatus for speech synthesis without prosody modification);

Document, Shih, C. L., "The Prosodic Domain of Tone Sandhi in Mandarin Chinese", PhD Dissertation, UC San Diego, 1986;

Document, Chu M. and Qian Y., "Locating boundaries for prosodic constituents in unrestricted Mandarin texts", Journal of Computational Linguistics and Chinese Language Processing, 6(1), 61-82, 2001;

Document, Dong H., Tao J. and Xu b., "Prosodic word prediction using the lexical information", International Conference on Natural Language Processing and Knowledge Engineering, Wuhan, 2005;

Document, Shao Y., Han, J., Liu T. and Zhao Y., "Prosodic word boundaries prediction for Mandarin text-to-speech", International Symposium on Tonal Aspects of Languages with Emphasis on Tone Languages, 159-162, Beijing, 2004;

Document, Dong M., Lua K. T. and Li H., "A probabilistic approach to prosodic word prediction for Mandarin Chinese TTS", 9th European Conference on Speech Communication and Technology, Lisbon, Portugal, 2005;

Document, Qin Shi and XiJun Ma, 2002. "Statistic prosody structure prediction", International Conference of the IEEE 2002 Workshop on Speech Synthesis, Santa Monica, Calif., 2002; and Document, Ying, Z., and Shi, X., "An RNN-based algorithm to detect prosodic phrase for Chinese TTS", International Conference on Acoustic, Speech and Signal Processing, 2001.

The contents of these patents and documents are incorporated herein as prior art documents of the present application for invention.

In general cases, the Chinese speech synthesis system consists of three modules, namely a text analyzing module, a prosody parameter predicting module and a backend synthesizing module. The Chinese text analyzing module includes word segmentation, part of speech annotation, phonetic notation, and prosodic structure prediction, etc. The first step is word segmentation. This is so because, unlike the texts of other languages such as the English, there is no space as a separating sign between words in the Chinese text to divide the words. Word segmentation is generally based on the analysis of the part of speech, to thereby not only reflect a certain syntactic structure but also slightly differ from the prosodic structure. The purpose of prosodic structure prediction is to find out an effective method to map the contents of the text as a prosodic structure, in order to construct a prediction model from the text to the prosodic characteristics (such as the stop and the tune) to guide the subsequent generation of prosodyparameters.

Many studies show that the prosodic words are greatly different from the words of the lexicology. One reason is that the forming of the prosodic words is based not only on the meanings of the words but also on the prosodic requirements of the speech. A prosodic word can contain more than one word as defined in the lexicology, and can also be a part of a relatively long word defined in the lexicology. The word dividing module and the part of speech annotating module perform the word segmentation and the corresponding part of speech annotation on the text of the natural language based on the knowledge of lexicology.

The following sample sentence describes two processing steps of the text analyzing module, namely word segmentation/part of speech annotation and prosodic structure prediction. As shown in FIG. 1:

A text is input as: "有一次，我们和外 校搞联谊爬香山，我们的学生没有一 个掉队的，噌噌 噌就爬上了山顶 (once at an extramural activity in which we and the pupils of other schools climbed the Fragrance Hill, no one of us lagged behind, as all climbed to the hilltop by leaps and bounds)".

The words are divided and the parts of speech are annotated as: 有/v 一/m 次/q ,/w 我们/r 和/p 外/f 校/Ng 搞/v 联谊/v 爬/v 香山/ns, /w 我们/r 的/u 学生/n 没有/v 一/m 个/q /v 的/u, /w 噌噌噌/o 就/d 爬/v 上/v 了/u 山顶/n 。/w".

The prosodic structure is as: "有/v 一/m 次/q|||我们/r 和/c 外/f 校/Ng||搞/v 联谊/v|爬/v 香山/ns|||我们/r 的/u|学生/n|| 没有/v 一/m 个/q|掉队/v 的/u|||噌噌噌/o|| 就/d 爬/v 上/v 了/u| 山顶/n|||".

The "|" indicates the boundary of the prosodic word, the "||" indicates the boundary of the prosodic phrase, and the "|||" indicates the boundary of the intonational phrase. The boundary of the prosodic phrase and the boundary of the intonational phrase is of necessity also a boundary of the prosodic word. The task of the prosodic word forming module is to determine the boundary of the prosodic word on the basis of the word segmentation and the part of speech annotation. In addition, the prosodic word forming is also the footstone for the prediction of a prosodic unit of higher level, such as the prediction of a prosodic phrase. Consequently, the stand or fall of the prosodic word forming is of very great significance to the naturalness of the synthesized speech.

Several methods have been proposed in the prior art for the prediction of the boundaries of the Chinese prosodic words, such as the Classification and Regression Tree (CART) method, rule-driven approach, statistical approach and recurrent neural network (RNN) method etc. Part of Speech (POS) and word length information are widely employed in these methods.

Generally speaking, it cannot be said that the prediction of the prosodic word boundaries is very precise in the state of the art. Errors of the boundary prediction are usually generalized into two types: one is the insertion error, and another one is the deletion error. As discussed above, not all prosodic word boundaries have stops in the actual speech. It is acceptable when there is a perceptible stop at the boundary of the prosodic word, but any perceptible stop inside the prosodic word will render the speech either hard to understand or unnatural. Therefore, the type of insertion error engendered by the prosodic word forming module will bring great harm to the synthesized speech. To the contrary, the type of deletion error brings far less harm to the synthesized speech. For instance, the word segmentation result of the last portion of the aforementioned sample sentence, "噌噌噌就爬上了 (climbed to . . . by leaps and bounds)", is "噌噌噌 就 爬 上 了" (see as shown in FIG. 1), in which the words "就", "爬", "上" and "了" are all single-character words. They should be combined together to become a complete prosodic word, "就爬上了 (climbed to . . . )". If they are not combined together at the level of the prosodic word, this section of the speech in the synthesized speech will be very unnatural to the audial perception. In the synthesized speech, they are to the audial perception as if they were pronounced word by word, and there are stops to the audial perception. This is so because the prosody predicting model (fundamental frequency prediction and audio duration prediction) is very sensitive as to whether the current syllable is at the boundary of the prosodic word or inside the prosodic word. Conversely, if "就爬上了" is taken as a prosodic word, its fundamental frequency curve will be heard as very natural, since the fundamental frequency predicting model takes more concerted pronunciation into consideration. Additionally, the audio duration model does not protract the audio durations of the first three syllables "就", "爬", and "上", because all the types of the boundaries of these three syllables currently pertain to the internal type of the prosodic word.

SUMMARY OF THE INVENTION

The objective of the present invention rests in providing a Chinese prosodic words forming method and apparatus, so as to overcome the defect as discussed above whereby the type of insertion error of the prosodic word would render the pronunciation hard to understand or unnatural, and to reduce the number of the type of insertion error of prosodic word boundaries. In order to achieve the aforementioned objective, the present invention provides a method of forming Chinese prosodic words, which method comprises the steps of inputting Chinese text; performing process of word segmentation and part of speech annotation for the input Chinese text to generate an initial prosodic word sequence; inserting grids representing prosodic word boundaries for all the words in the initial prosodic word sequence to generate a grid prosodic word sequence; annotating the grids ready to be deleted in the grid prosodic word sequence based on the prosodic word forming means; judging the grids which actually need to be deleted in the grids ready to be deleted based on the prosodic word forming means; deleting the grids which actually need to be deleted in the grid prosodic word sequence, and word forming the words between every two grids in the remaining grids to generate prosodic words.

Word dividing and part of speech annotating the input Chinese text are performed to generate word segmentation result, and generate an initial prosodic word sequence based on the word segmentation result.

The said annotating the grids ready to be deleted in the grid prosodic word sequence based on the prosodic word forming means indicates annotating the grids to be deleted in the same grid prosodic word sequence based on a plurality of prosodic word forming means.

The said judging the grids which actually need to be deleted in the grids ready to be deleted based on the prosodic word forming means indicates comprehensively judging the grids which actually need to be deleted in the grids to be deleted based on a plurality of prosodic word forming means.

The said deleting the grids which actually need to be deleted in the grid prosodic word sequence includes: comprehensively judging the grids ready to be deleted at present based on the plurality of prosodic word forming means, providing trust degree of the grids which need to be deleted for the grids to be deleted at present; and judging whether the grids ready to be deleted need to be deleted based on the trust degree, if yes, deleting the grids to be deleted at present.

The present invention further provides an apparatus of forming Chinese prosodic words, which apparatus comprises an input part for inputting Chinese text; a word segmentation and part of speech annotating part for performing process of word segmentation and part of speech annotation for the input Chinese text to generate an initial prosodic word sequence; a prosodic word grid insert part for inserting grids representing prosodic word boundaries for all the words in the initial prosodic word sequence to generate a grid prosodic word sequence; a prosodic word grid delete part for annotating the grids ready to be deleted in the grid prosodic word sequence based on the prosodic word forming means, judging the grids which actually need to be deleted in the grids ready to be deleted based on the prosodic word forming means, and deleting the grids which actually need to be deleted in the grid prosodic word sequence; and a prosodic word generating part for forming the words between every two grids in the remaining grids to generate prosodic words.

The apparatus further comprises a word dividing result storage part for storing the word dividing result after the process of word dividing and part of speech annotating the input Chinese text to generate an initial prosodic word sequence based on the word segmentation result.

The prosodic word grid deletion part comprises a unit for a plurality of prosodic word forming means used for annotating the grids ready to be deleted in the same grid prosodic word sequence based on the plurality of prosodic word forming means.

The said judging the grids which actually need to be deleted in the grids to be deleted based on the prosodic word forming means indicates comprehensively judging the grids which actually need to be deleted in the grids to be deleted based on the plurality of prosodic word forming means.

The prosodic word grid deletion part further comprises a grid deletion trust degree evaluation unit for comprehensively judging the grids ready to be deleted at present based on the plurality of prosodic word forming means, providing trust degree of the grids which need to be deleted for the grids ready to be deleted at present; and a grid deletion unit for judging whether the grids ready to be deleted at present need to be deleted based on the trust degree, if yes, deleting the grids ready to be deleted at present.

The apparatus further comprises a prosodic word forming result analysis part for analyzing and processing the prosodic words generated by the prosodic word generating part to generate prosodic word forming analysis result.

The present invention further provides a program of forming Chinese prosodic words, which program comprises inputting Chinese text; performing process of word segmentation and part of speech annotation for the input Chinese text to generate an initial prosodic word sequence; inserting grids representing prosodic word boundaries for all the word boundaries in the initial prosodic word sequence to generate a grid prosodic word sequence; annotating the grids ready to be deleted in the grid prosodic word sequence based on the prosodic word forming means; judging the grids which actually need to be deleted in the grids ready to be deleted based on the prosodic word forming means; deleting the grids which actually need to be deleted in the grid prosodic word sequence, and word forming the words between every two grids in the remaining grids to generate prosodic words.

The present invention further provides a readable storage medium of storing Chinese prosodic words forming program, which readable storage medium stores the following programs of inputting Chinese text; performing process of word segmentation and part of speech annotation for the input Chinese text to generate an initial prosodic word sequence; inserting grids representing prosodic word boundaries for all the word boundaries in the initial prosodic word sequence to generate a grid prosodic word sequence; annotating the grids ready to be deleted in the grid prosodic word sequence based on the prosodic word forming means; judging the grids which actually need to be deleted in the grids ready to be deleted based on the prosodic word forming means; deleting the grids which actually need to be deleted in the grid prosodic word sequence, and word forming the words between every two grids in the remaining grids to generate prosodic words.

The advantageous effect of the present invention is to employ the grid deletion policy to make it possible for a plurality of prosodic word forming means to work in concert. The word segmentation result of the input natural language text is regarded as an initial prosodic word sequence, and it is assumed here that grids of prosodic words are inserted into all word boundaries. On the basis of this, the plurality of prosodic word forming means can work in concert, since every prosodic word forming method can delete the grids considered to be no longer required at the level of the prosodic word. In other words, if any random prosodic word forming method considers a certain grid to be no longer required, this grid is deleted. The present invention overcomes the defect whereby the type of insertion error of the prosodic word would render the pronunciation hard to understand or unnatural, and reduces the number of the type of insertion error of prosodic word boundaries. By employing the grid deletion policy, the present invention makes it possible for a plurality of prosodic word forming means to work in concert. Such a framework makes it possible for a new prosodic word forming method to be easily combined, thus facilitating the maintenance and modification of the system.

EXPLANATIONS OF THE DRAWINGS ACCOMPANYING THE DESCRIPTION

SPECIFIC EMBODIMENTS

Figure 1:
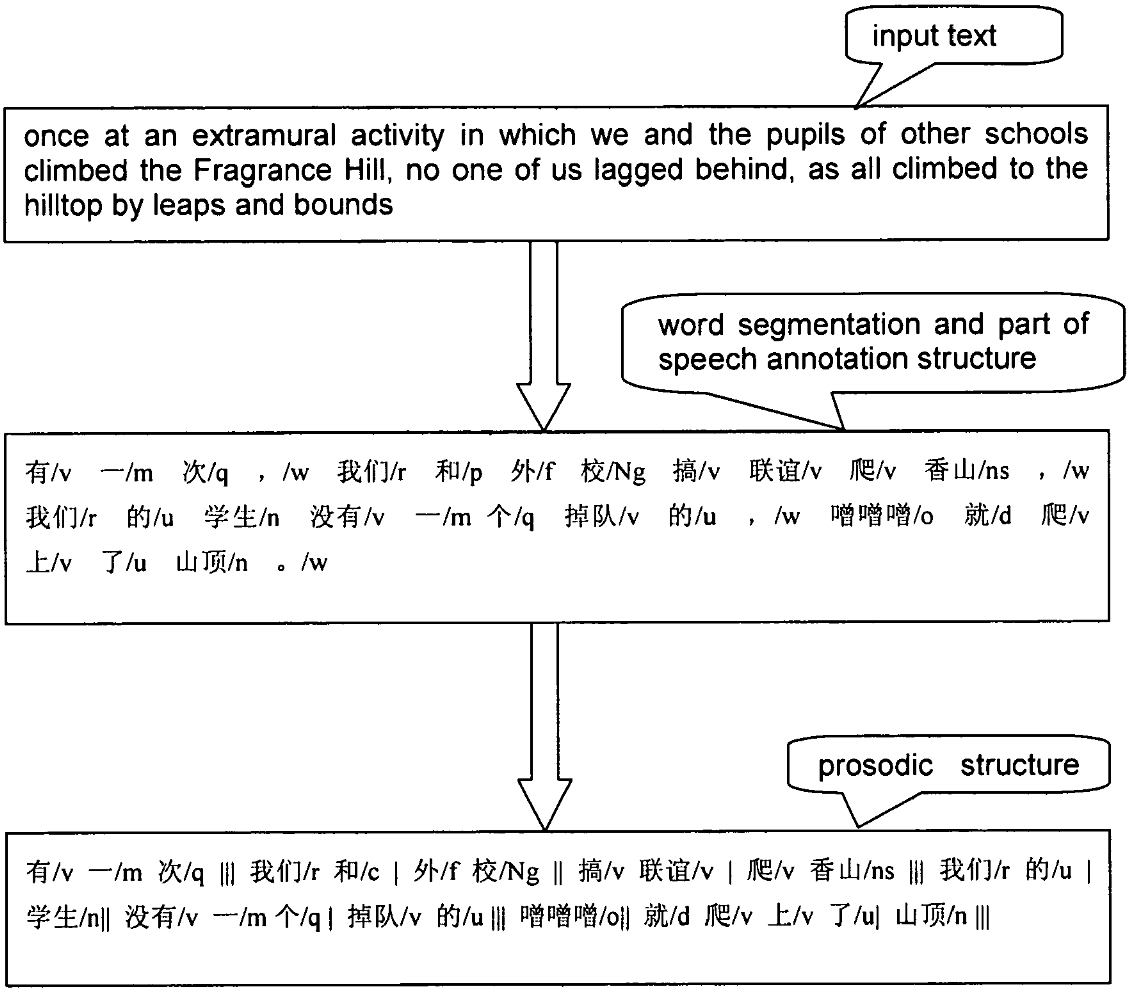
FIG. 1 is a schematic diagram showing the word segmentation and part of speech annotation in a text as well as the prosodic structure in the prior art.
Figure 2:
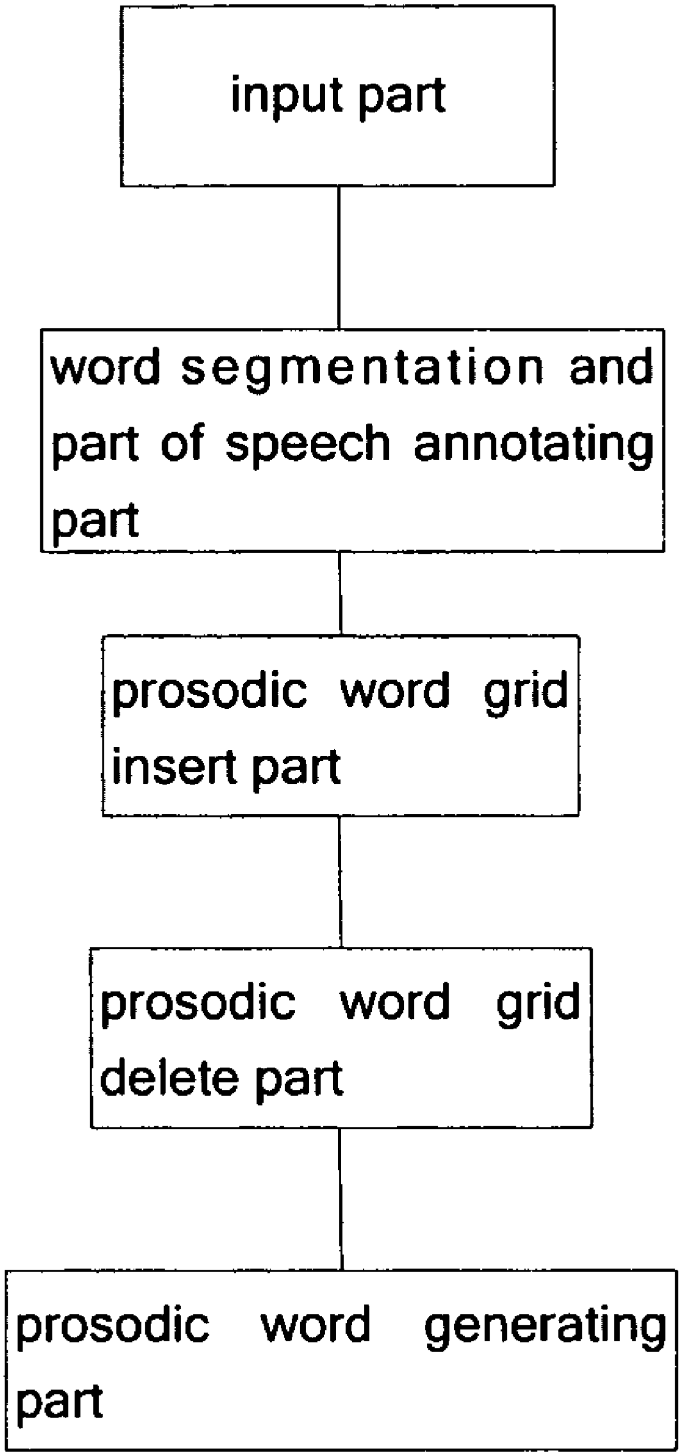
FIG. 2 is a block diagram showing the structure of the apparatus according to the present invention.

Specific embodiments of the present invention are explained below in combination with the accompanying drawings. As shown in FIG. 2, the present invention is embodied as an apparatus of forming Chinese prosodic words, which apparatus comprises an input part for inputting Chinese text; a word segmentation and part of speech annotating part for performing process of word segmentation and part of speech annotation for the input Chinese text to generate an initial prosodic word sequence; a prosodic word grid insert part for inserting grids representing prosodic word boundaries for all the word boundaries in the initial prosodic word sequence to generate a grid prosodic word sequence; a prosodic word grid delete part for annotating the grids ready to be deleted in the grid prosodic word sequence based on the prosodic word forming means, judging the grids which actually need to be deleted in the grids ready to be deleted based on the prosodic word forming means, and deleting the grids which actually need to be deleted in the grid prosodic word sequence; and a prosodic word generating part for forming the words between every two grids in the remaining grids to generate prosodic words.

The apparatus further comprises a word dividing result storage part for storing the word dividing result after the process of word dividing and part of speech annotating the input Chinese text to generate an initial prosodic word sequence based on the word segmentation result.

The prosodic word grid deletion part further comprises a grid deletion trust degree evaluation unit for comprehensively judging the grids ready to be deleted at present based on the plurality of prosodic word forming means, providing trust degree of the grids which need to be deleted for the grids ready to be deleted at present; and a grid deletion unit for judging whether the grids ready to be deleted at present need to be deleted based on the trust degree, if yes, deleting the grids ready to be deleted at present.

The prosodic word grid deletion part comprises a unit for a plurality of prosodic word forming means used for annotating the grids ready to be deleted in the same grid prosodic word sequence based on the plurality of prosodic word forming means. The said judging the grids which actually need to be deleted in the grids to be deleted based on the prosodic word forming means indicates comprehensively judging the grids which actually need to be deleted in the grids to be deleted based on the plurality of prosodic word forming means.

The apparatus further comprises a prosodic word forming result analysis part for analyzing and processing the prosodic words generated by the prosodic word generating part to generate prosodic word forming analysis result.

The present invention can be implemented in a computer, a server or a computer network, wherein the input part can be such devices as a keyboard, a mouse, or a communication interface.

Figure 3:
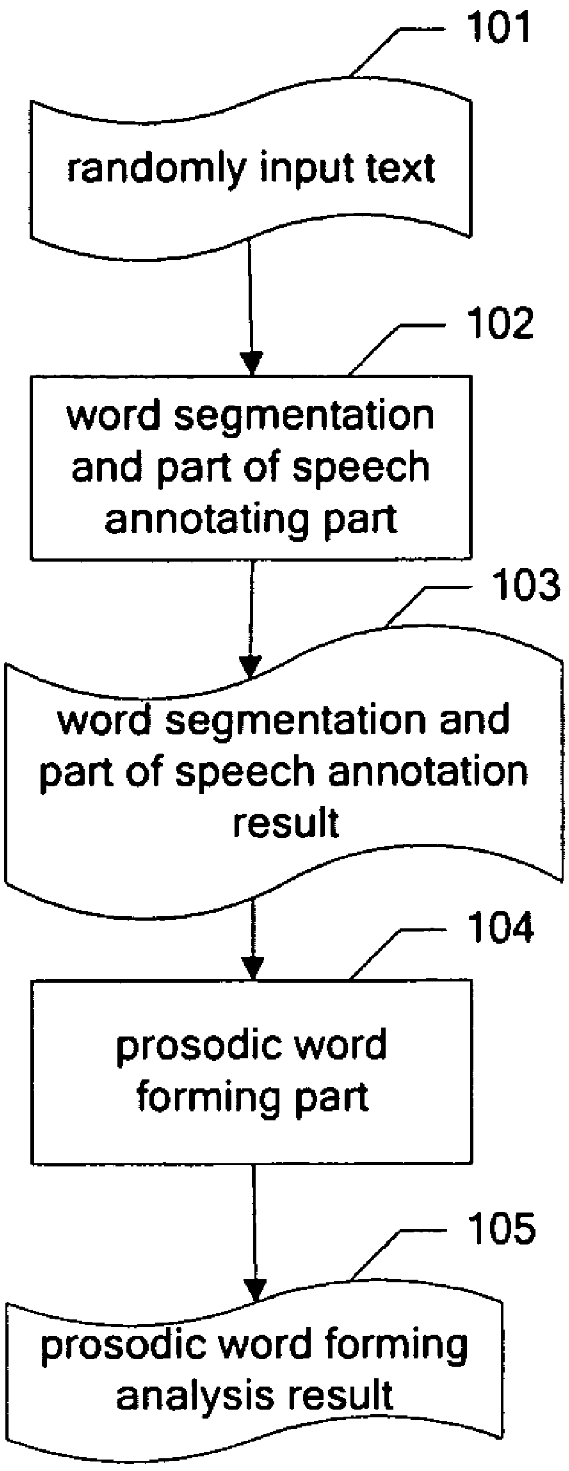
FIG. 3 is a flowchart showing an embodiment of the apparatus according to the present invention.

Embodiments:

As shown in FIG. 3, the module 101 is a randomly input text.

The word segmentation and part of speech annotating part (the module 102) performs word segmentation and part of speech annotation on an input text. This module is the basis upon which the Chinese text analysis depends, because, unlike the texts of other languages such as the English, there is no space as a separating sign between words in the Chinese text to divide the words. Accordingly, it is necessary to firstly perform word segmentation and part of speech annotation on the input text, and the result obtained thereby is written into the module 103 to function as the basis for the subsequent processing.

In the specific embodiment, the prosodic word grid insert part, the prosodic word grid delete part and the prosodic word generating part can be unified as a prosodic word forming part (the module 104) as the main body of the present invention. The module employs the grid deletion policy and thereby supports a plurality of prosodic word forming means to work in concert. The word segmentation result of the input text is regarded as an initial prosodic word sequence, and it is assumed here that grids of prosodic words are inserted into all word boundaries. On the basis of this, the plurality of prosodic word forming means work in concert to mark eliminable signs on the grids on longer required at the level of the prosodic word. Finally, each of the grids is uniformly judged as to whether it can be deleted and the actual grid deletion is carried out.

The module 105 is the final prosodic word forming analysis result.

Figure 4:
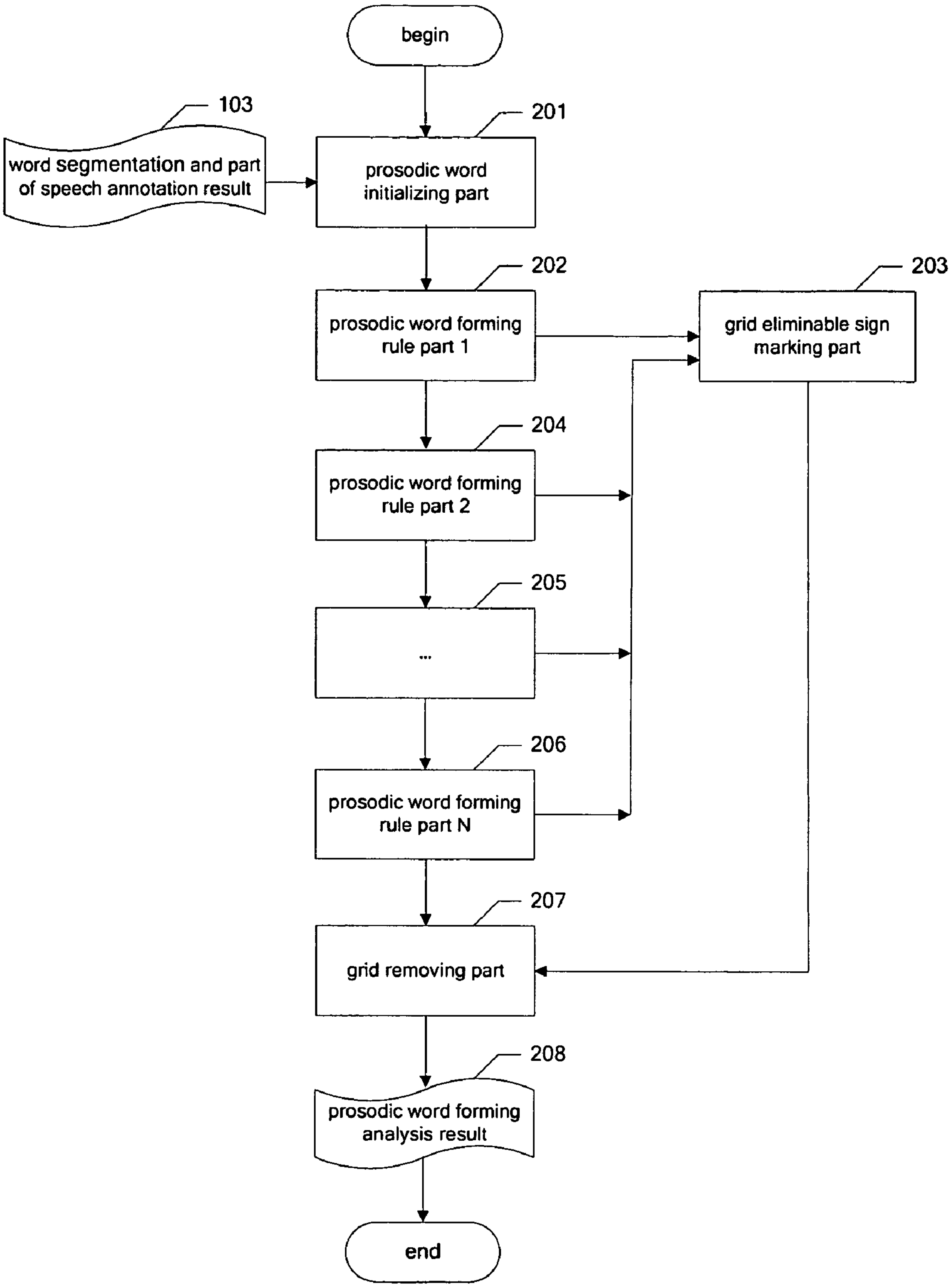
FIG. 4 is a flowchart showing the prosodic word forming process according to the present invention.

FIG. 4 shows in detail the processing flow of the prosodic word forming part (the module 104).

The module 201 is a prosodic word initializing part, which performs initialization of the prosodic words based on the word segmentation and part of speech annotation result stored in the module 103. Specifically, the word segmentation result is regarded as an initial prosodic word sequence, and grids representing prosodic word boundaries are inserted into all word boundaries.

The module 202 performs word forming process based on the prosodic word forming means 1. The module 202 makes use of the prosodic word forming means 1 to perform word forming on the prosodic words with each of the words in the initial word segmentation result as the basic unit. At the same time, the grids judged in the prosodic word forming means 1 to be deleted are marked with eliminable signs by the module 203 (a grid eliminable sign marking part).

Modules 204 through 206 perform word forming processes based on prosodic word forming means 2 to N. They make respective use of the corresponding prosodic word forming means 2 to N to perform word forming on the prosodic words. At the same time, the grids judged in the prosodic word forming means to be deleted are also marked with eliminable signs by the grid eliminable sign marking part. The prosodic word forming means 1 to N can be used as a component part of the prosodic word grid delete part, namely as a prosodic word forming means part, so as to mark the grids ready to be deleted in the same grid prosodic word sequence based on the plurality of prosodic word forming means.

The prosodic word forming means 1 to N can be embodied as follows.

(1) A prosodic word forming method based on a binary prosodic tree as the prosodic word forming means 1: this prosodic word forming means bases on a linguistic model obtained by training from a large scale marking linguistic materials to find the most probable phonetic stop insertion point through recursive bifurcation search with regard to an input sentence, so as to construct the optimum phonetic stop bifurcated tree to which this sentence corresponds. This bifurcated tree can be referred to as a prosodic structure bifurcated tree, since it subsumes therein the layered information of the phonetic stop insertion point. This prosodic structure bifurcated tree will be used as a prosodic word forming method for application on the prosodic word forming based on the grid deletion policy. The prosodic word grid between any random two son nodes having the same father node will be marked with the eliminable sign.

(2) A prosodic word forming method based on statistical probability as the prosodic word forming means 2, in which part of speech (POS) and word length information are used to predict the boundaries of the prosodic words. This method assumes that the part of speech information and the word length information are independent of and irrelevant to each other during prediction of the prosodic words. Thus, the probabilities for any two random words in the linguistic sense being combined into a prosodic word consist of two parts, i.e., the probability of combining into a prosodic word based on the consideration of the part of speech of these two words, and the probability of combining into a prosodic word based on the consideration of the word lengths of these two words.

(3) A prosodic word forming method based on rules as the prosodic word forming means N (in this example, N=3), wherein corresponding prosodic word forming rules are designed for the words affixed to some frequently used prosodic words. In the Chinese language, suffix morphemes such as "子, 们, 系, 了", structural auxiliary words such as "的, 得", words showing orientations such as "左右, 以后, 以前, 以上, 以下, 以内, 以外, 之后, 之前, 之上, 之下, 之内, 之外, 之间" and verbal phrases such as "起, 到, 进, 上, 下" frequently appear in the text. These words usually have fixed prosodic word forming modes, or have fixed prosodic word forming modes under certain conditions. For instance, "家长+们", "走向+了 世界" and "搞+一下" etc. If these words are not correctly formed into the proper prosodic words, the synthesized speech will be very unnatural to the audial perception. Therefore, prosodic word forming rules can be designed with specific regard to these frequently used prosodic affixing words, so as to ensure that these frequently used prosodic affixing words can be correctly formed into the prosodic words.

Additionally, there are several modes of superimposition for the verbs of the Chinese language, such as "V-V", "V了V" and "V了-V" ("谈一谈", "想了想" and "读了一读"). They are divided in the word segmentation process as verbal phrases, for example, "谈| 一|谈". In fact, these verbal phrases of the superimposed mode should be regarded as a complete prosodic word in the natural prosody. Consequently, the present invention also designs corresponding prosodic word forming rules for the verbs of the superimposed mode, so as to ensure that they can be correctly formed into a prosodic word. The aforementioned plurality of prosodic word forming means work in concert on the prosodic word forming according to this invention.

The module 207 is a grid removing part. This module performs synthetical judgment based on the grid eliminable marks marked by the aforementioned N types of prosodic word forming means to determine the prosodic word grids to be finally deleted. Finally, the words between every two grids are formed together to become the prosodic word, and the analysis result is stored in the prosodic word forming analysis result in the module 208.

Figure 5:
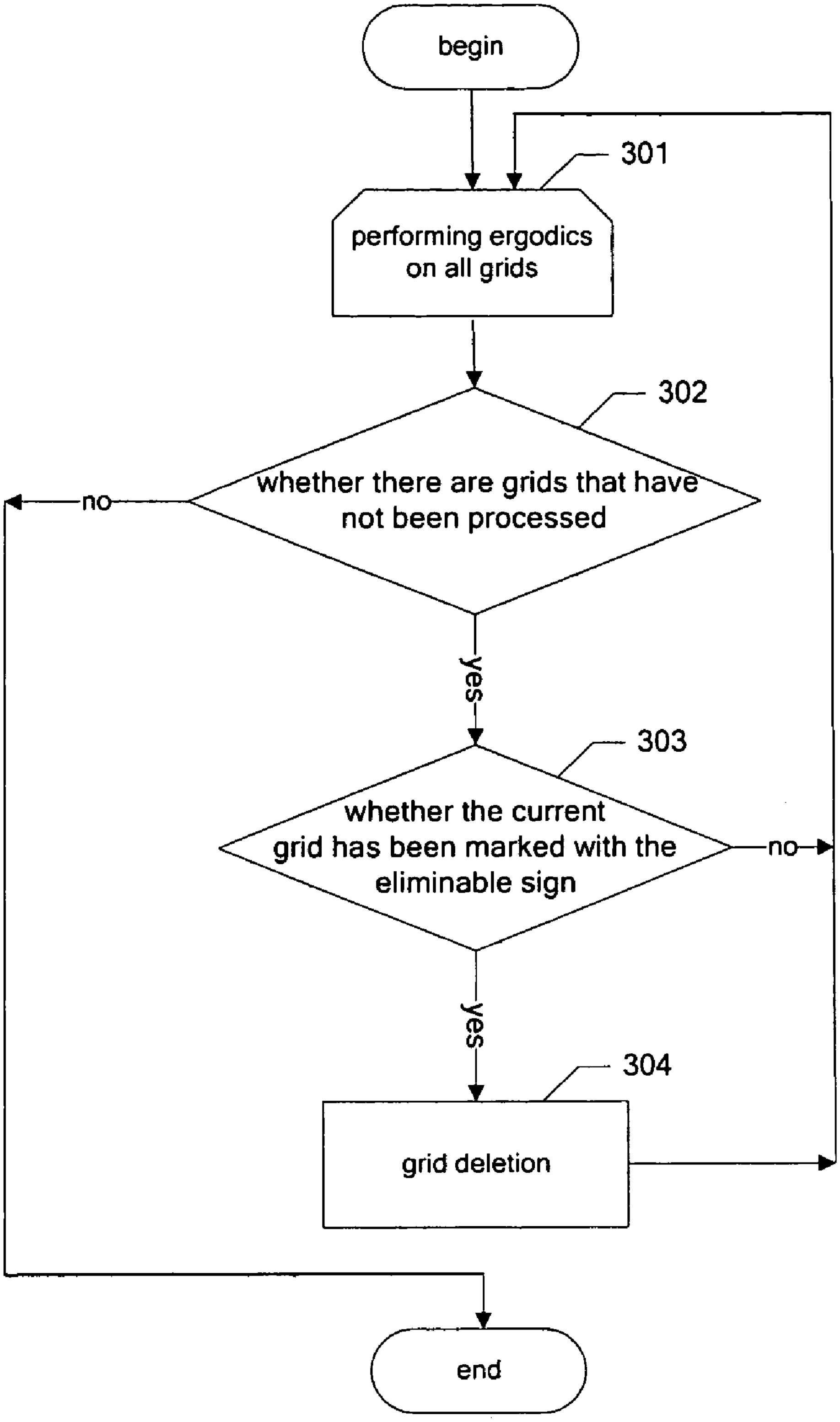
FIG. 5 is a flowchart showing a grid deletion process according to the present invention.

FIG. 5 shows a specific embodiment of the grid removing part (the module 207).

The module 301 is responsible for performing ergodics on all the initial grids.

The module 302 is responsible for checking as to whether there are grids that have not been processed. It is here a simple sequential process. If there are grids that have not been processed, they are transferred to the module 303 for processing there. If all the grids are processed, the processing ends.

The module 303 is responsible for checking as to whether the current grid has been marked with the eliminable sign: if it is found that the current grid has been marked with the eliminable sign by at least one prosodic word forming method, the grid is transferred to the module 304; and it is otherwise transferred to the module 301.

The module 304 is a grid delete part for performing specific operation of deleting the grids.

Figure 6:
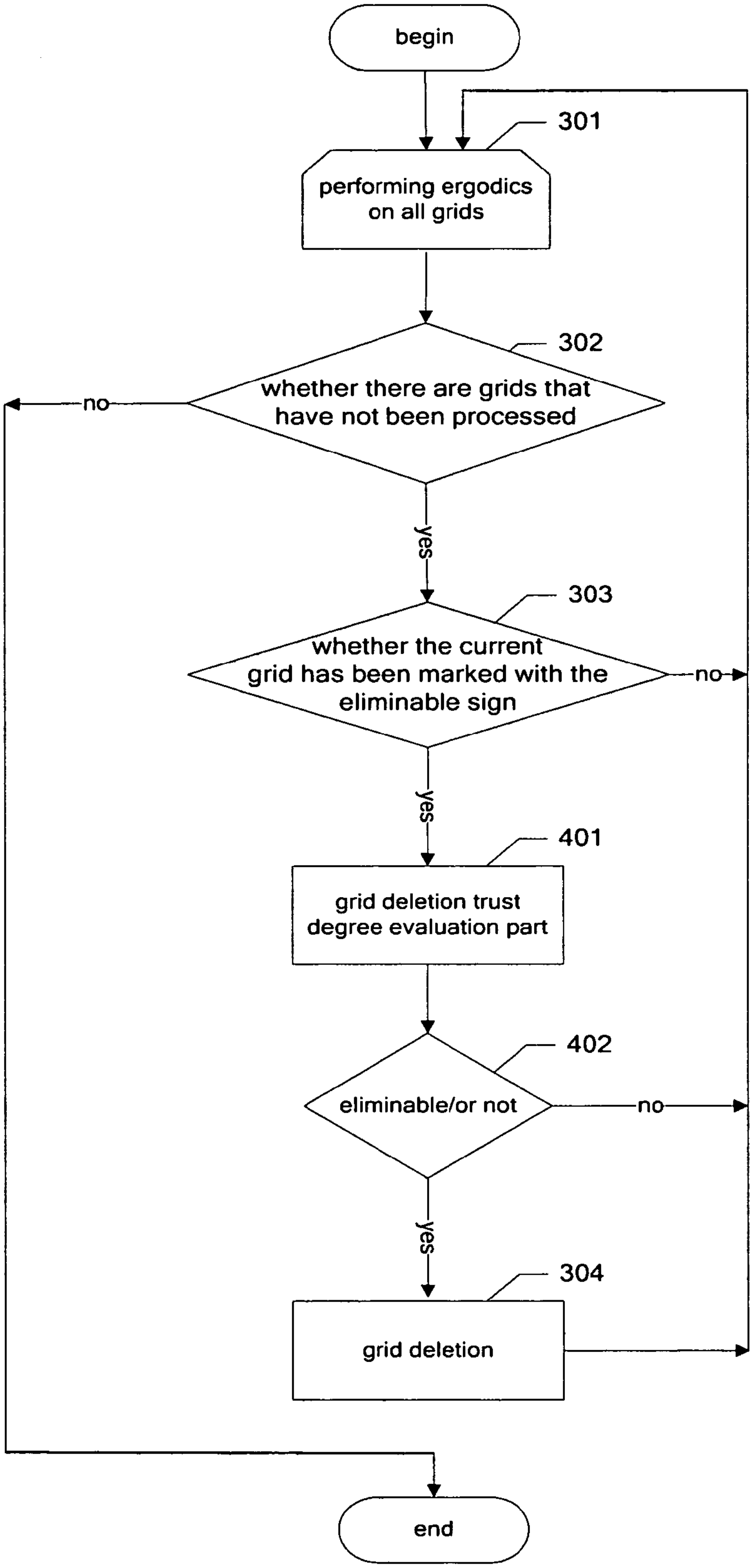
FIG. 6 is a flowchart showing another grid deletion process according to the present invention.

FIG. 6 shows a more general embodiment of the grid removing part (the module 207), wherein the same parts as those in FIG. 5 are not repeated here.

The module 401 is a grid deletion trust degree evaluation part. This module provides in a synthetical manner the eliminable trust degree of the current grid based on the mark of the N type prosodic word forming method as to whether the current grid is eliminable.

The module 402 judges as to whether the current grid is eliminable based on the trust degree evaluation result of the module 401: if eliminable, it is transferred to the module 403 for processing; and it is otherwise transferred to the module 301.

The grid deletion trust degree evaluation part can be carried out through the balloting mechanism. One simplest balloting mechanism can be performed as follows: if more than half of the N types of prosodic word forming means consider it necessary to delete the current grid, the grid deletion trust degree evaluation part considers it necessary to delete the current grid.

The present invention employs the grid deletion policy to make it possible for a plurality of prosodic word forming means to work in concert. The word segmentation result of the input natural language text is regarded as an initial prosodic word sequence, and it is assumed here that grids of prosodic words are inserted into all word boundaries. On the basis of this, the plurality of prosodic word forming means can work in concert, since every prosodic word forming method can delete the grids considered to be no longer required at the level of the prosodic word. In other words, if any random prosodic word forming method considers a certain grid to be no longer required, this grid is deleted. The present invention avoids the defect whereby the type of insertion error of the prosodic word would render the pronunciation hard to understand or unnatural as far as possible, and reduces the number of the type of insertion error of prosodic word boundaries. By employing the grid deletion policy, the present invention makes it possible for a plurality of prosodic word forming means to work in concert. Such a framework makes it possible for a new prosodic word forming method to be easily combined, thus facilitating the maintenance and modification of the system.

The aforementioned specific embodiments are employed only to explain, rather than to limit, the present invention.

The invention claimed is:

1. A method of forming Chinese prosodic words, implemented using a computer, said method comprising:

inputting Chinese text;

performing, via a computer, a process of word segmentation and part of speech annotation for the input Chinese text submitted to the computer to generate an initial prosodic word sequence;

inserting grids representing prosodic word boundaries for all the words in the initial prosodic word sequence to generate a grid prosodic word sequence including inserting at least one eliminable indicator in the grid prosodic word sequence;

annotating grids ready to be deleted in the grid prosodic word sequence based on a prosodic word forming means;

comprehensively judging grids which actually need to be deleted in the grids ready to be deleted based on a plurality of prosodic word forming means, the plurality of prosodic word forming means including a prosodic word forming based on a binary prosodic tree, a prosodic word forming based on statistical probability, and a prosodic word forming based on rules, and wherein said comprehensively judging includes providing a trust degree for the grids ready to be deleted and judging whether the grids ready to be deleted actually need to be deleted based on said trust degree by checking whether a current grid has been marked with the at least one eliminable indicator; and the grids which actually need to be deleted in the grid prosodic word sequence are deleted when said comprehensively judging indicates deletion, and forming the words between every two grids in the remaining grids to generate prosodic words.

2. The method according to claim 1, characterized in word dividing and part of speech annotating the input Chinese text to generate word segmentation result, and generating an initial prosodic word sequence based on said word segmentation result.

3. The method according to claim 1, characterized in that annotating said grids ready to be deleted defines annotating the grids ready to be deleted in the same grid prosodic word sequence forming of a plurality of prosodic words.

4. An apparatus to form Chinese prosodic words, comprising:

an input part to input Chinese text;

a word segmentation and part of speech annotating part to perform a process of word segmentation and part of speech annotation for the input Chinese text to generate an initial prosodic word sequence;

a prosodic word grid insert part to insert grids representing prosodic word boundaries for all the words in the initial prosodic word sequence to generate a grid prosodic word sequence including inserting at least one eliminable indicator in the grid prosodic word sequence;

a prosodic word grid delete part to annotate grids ready to be deleted in the grid prosodic word sequence based on a prosodic word forming means, the plurality of prosodic word forming means including a prosodic word forming based on a binary prosodic tree, a prosodic word forming based on statistical probability, and a prosodic word forming based on rules;

a grid deletion trust degree evaluation part to comprehensively to judge grids which actually need to be deleted in the grids ready to be deleted based on a plurality of prosodic word forming means and to provide a trust degree for the grids ready to be deleted;

a grid deletion part to judge whether the grids ready to be deleted actually need to be deleted based on said trust degree and to delete the grids which actually need to be deleted in the grid prosodic word sequence in accordance with a result from the grid deletion part by checking whether a current grid has been marked with the at least one eliminable indicator; and a prosodic word generating part to form the words between every two grids in the remaining grids to generate prosodic words.

5. The apparatus according to claim 4, comprising:

a word dividing result storage part for storing the word dividing result after the process of word dividing and part of speech annotating the input Chinese text to generate an initial prosodic word sequence based on said word segmentation result.

6. The apparatus according to claim 4, characterized in that said prosodic word grid delete part comprises:

a plurality of prosodic word forming part to annotate said grids ready to be deleted and define annotating the grids ready to be deleted in the same grid prosodic word sequence based on the plurality of prosodic word forming means.

7. The apparatus according to claim 4, comprising:

a prosodic word forming result analysis part for analyzing and processing the prosodic words generated by the prosodic word generating part to generate prosodic word forming analysis result.

8. A program embedded in an apparatus and causing the apparatus to execute an operation including forming Chinese prosodic words, the operation comprising:

inputting Chinese text;

performing a process of word segmentation and part of speech annotation for the input Chinese text to generate an initial prosodic word sequence;

inserting grids representing prosodic word boundaries for all the words in the initial prosodic word sequence to generate a grid prosodic word sequence including inserting at least one eliminable indicator in the grid prosodic word sequence;

annotating grids ready to be deleted in the grid prosodic word sequence based on a prosodic word forming means;

comprehensively judging grids which actually need to be deleted in the grids ready to be deleted based on a plurality of prosodic word forming means, said comprehensively judging includes providing a trust degree for the grids ready to be deleted and judging whether the grids ready to be deleted actually need to be deleted based on said trust degree by checking whether a current grid has been marked with the at least one eliminable indicator; and deleting the grids which actually need to be deleted in the grid prosodic word sequence when said comprehensively judging indicates deletion, and forming the words between every two grids in the remaining grids to generate prosodic words, and wherein the plurality of prosodic word forming means includes a prosodic word forming based on a binary prosodic tree, a prosodic word forming based on statistical probability, and a prosodic word forming based on rules.

9. A non-transitory computer readable storage medium storing Chinese prosodic words forming program to cause a computer to execute an operation, comprising:

inputting Chinese text;

performing a process of word segmentation and part of speech annotation for the input Chinese text to generate an initial prosodic word sequence;

inserting grids representing prosodic word boundaries for all the words in the initial prosodic word sequence to generate a grid prosodic word sequence including inserting at least one eliminable indicator in the grid prosodic word sequence;

annotating grids ready to be deleted in the grid prosodic word sequence based on a prosodic word forming means;

comprehensively judging grids which actually need to be deleted in the grids ready to be deleted based on a plurality of prosodic word forming means, the plurality of prosodic word forming means including a prosodic word forming based on a binary prosodic tree, a prosodic word forming based on statistical probability, and a prosodic word forming based on rules, and said comprehensively judging includes providing a trust degree the grids to be deleted;

judging whether the grids ready to be deleted actually need to be deleted based on said trust degree by checking whether a current grid has been marked with the at least one eliminable indicator;

deleting the grids which actually need to be deleted in the grid prosodic word sequence when said comprehensively judging indicates deletion, and forming the words between every two grids in the remaining grids to generate prosodic words.

10. The non-transitory computer readable storage medium according to claim 9, wherein a result of the word segmentation of the input Chinese text defines boundaries of the initial word sequence using which the grids representing the prosodic word boundaries are inserted into all the word boundaries.

* * * * *